UNITED STATES PATENT OFFICE.

MORITZ ULRICH AND RICHARD LAUCH, OF ELBERFELD, GERMANY, ASSIGNORS TO THE FARBENFABRIKEN, VORMALS FR. BAYER & CO., OF SAME PLACE.

BLUE-BLACK TETRAZO DYE.

SPECIFICATION forming part of Letters Patent No. 501,118, dated July 11, 1893.

Application filed February 1, 1893. Serial No. 460,560. (Specimens.) Patented in France September 2, 1889, No. 200,520; in Italy September 30, 1889, XXIII, 26,159; in England March 4, 1890, No. 3,397; in Germany August 6, 1890, No. 57,912, and in Austria-Hungary December 6, 1891, No. 3,952 and No. 3,678.

*To all whom it may concern:*

Be it known that we, MORITZ ULRICH and RICHARD LAUCH, chemists, doctors of philosophy, (assignors to the FARBENFABRIKEN, VORMALS FR. BAYER & CO., of Elberfeld,) subjects of the German Emperor, residing at Elberfeld, Germany, have invented a new and useful Improvement in the Manufacture of Direct-Dyeing Coloring-Matters, (for which the said FARBENFABRIKEN has already obtained Letters Patent in the following countries: Germany, No. 57,912, dated August 6, 1890; England, No. 3,397, dated March 4, 1890; France, No. 200,520, dated September 2, 1889; Austria-Hungary, Vol. XLI, No. 3,952, and Vol. XXV, No. 3,678, dated December 6, 1891, and Italy, Vol. XXIII, No. 26,159, dated September 30, 1889,) of which the following is a specification.

Our invention relates to the production of a new direct dyeing coloring-matter by combining one molecular proportion of tetrazoorthoditolylchlorid or another tetrazoorthoditolyl salt with one molecular proportion of alphanaphthylamine, by further diazotizing the intermediate product and coupling the so formed tetrazo salt with two molecular proportions of 1:8—dihydroxynaphthalene monosulpho acid or alkaline salts thereof.

In carrying out our invention practically we proceed as follows: 3.1 kilos, by weight, of orthotolidine sulfate or the corresponding quantity of another orthotolidine salt are converted into the tetrazo compound in the usual manner by means of 1.4 kilos, by weight, of sodium nitrite in a solution of dilute hydrochloric acid solution. The tetrazo solution thus obtained is allowed to flow into the watery solution of 1.8 kilos, by weight, of alphanaphthylamine hydrochlorid with the addition of hydrochloric acid in a small excess. After some hours the formation of the intermediate product is complete. In order to diazotize this intermediate product a concentrated solution in water of 0.7 kilos, by weight, of sodium nitrite is added to the above liquid mixture, and hydrochloric acid is slowly added, until the mixture shows a lasting acid reaction. When after about six hours the diazotation is finished, the resulting liquid is introduced into the watery solution of 5.24 kilos, by weight, of the sodium salt of 1:8—dihydroxynaphthalene alphamonosulpho acid and about ten kilos, by weight, of sodium acetate. After some hours the whole mixture is treated for a short time at about 60° centigrade, in order to complete the combination of the tetrazo compound with the dihydroxynaphthalene alphamonosulpho acid employed. Then the mixture is neutralized by the addition of sodium carbonate, and the complete dye-stuff is salted out, filtered off, pressed and dried. Its composition corresponds to the following formula:

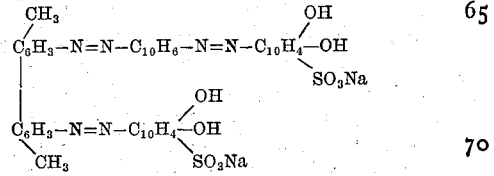

Our new dye-stuff thus produced forms in a dried and pulverized state a grayish-black powder. It dissolves in water with bluish-black color; in alcohol it is almost insoluble. By ammonia-liquid it is dissolved with bluish-black color. In sodium carbonate and soda-lye it difficultly dissolves at ordinary temperature, somewhat more easily on heating with bluish-black color. In diluted hydrochloric and sulfuric acid it is almost insoluble. On the addition of ammonia to its watery solutions the color is not altered, while by adding sodium carbonate the color becomes somewhat more reddish and after some time blue flakes are separated. When the watery solutions are mixed with soda-lye, the original color becomes at first a little greener, and then dark blue flakes are precipitated. On adding diluted hydrochloric or sulfuric acid to its solutions in water, the latter assume a greener color and after some time a dark blue precipitate is separated. It dissolves in concentrated sulfuric acid with greenish-black color, which turns into greenish-blue on the addition of ice water, while after some time bluish-green flakes are precipitated. It produces on unmordanted cotton in a neutral or alkaline soap bath from greenish blue to bluish-black shades possessing a great fastness against the action of alkalies and acids.

This die-stuff is not identical with the coloring-matter which we have described in a separate patent, No. 476,337, granted June 7, 1892, as this latter product is obtained from the tetrazo compound of dianisidine, viz., by the combination of tetrazoorthodiphenol-dimethylether with alphanaphthylamine in equal molecular proportions, by rediazotizing this intermediate product thus obtained and coupling the resulting tetrazo compound with two molecular proportions of 1:8—dihydroxy-naphthalene alphamonosulphonate of sodium. The dye-stuff, which is obtained in this manner, possesses the following composition:

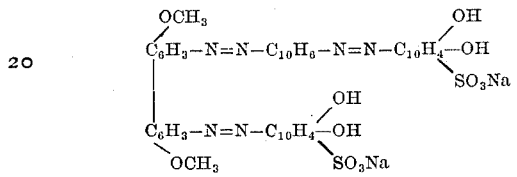

Our product also differs from that dye-stuff which is formed by combining equal molecular proportions of tetrazodiphenyl salt and alphanaphthylamine, by further diazotizing the so formed intermediate product and coupling the tetrazo compound thus obtained with two molecular proportions of 1:8 — amido-naphthol betadisulphonate of sodium. This coloring matter which is described in a separate specification, Serial No. 419,947, filed February 1, 1892, is of the following composition:

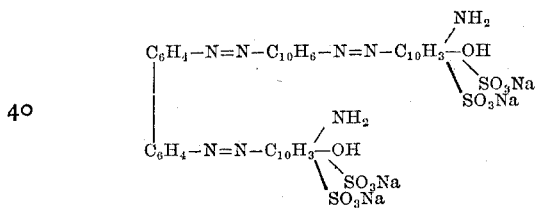

Having thus described our invention and in what manner it can be performed, that which we claim as new, and desire to secure by Letters Patent, is—

1. The process for producing a new direct dyeing coloring-matter by combining one molecular proportion of tetrazoorthoditolyl salt with one molecular proportion of alphanaphthylamine, by further diazotizing the resulting intermediate product and coupling the tetrazo compound thus obtained with two molecular proportions of 1:8—dihydroxynaphthalene alphamonosulpho acid or an alkaline salt thereof.

2. As a new product the direct dyeing coloring-matter having the formula:

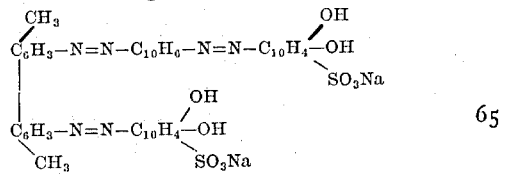

forming a grayish-black powder, nearly insoluble in dilute hydrochloric and sulfuric acid and in alcohol; soluble in ammonia with bluish-black color, difficultly soluble in sodium carbonate and soda-lye at ordinary temperature; more easily on heating with bluish-black color; soluble in water with bluish-black color, which is not altered on addition of ammonia, which turns slightly redder on addition of sodium carbonate, and separates after some time blue flakes, and which on addition of soda-lye turns at first slightly greener, and then separates dark blue flakes; soluble in concentrated sulfuric acid with greenish-black color, which changes into greenish-blue on addition of ice-water, and separates after some time bluish-green flakes; dyeing unmordanted cotton in a neutral or alkaline bath greenish-blue to bluish-black shades; and having the qualities substantially as specified.

In testimony whereof we have signed our names in the presence of two subscribing witnesses.

MORITZ ULRICH.
RICHARD LAUCH.

Witnesses:
WM. ESSENWEIN,
RUDOLPH FRICKE.